May 27, 1958     C. J. WHEELER     2,835,969

APPARATUS FOR SEVERING CAST IRON PIPE AND THE LIKE

Original Filed Nov. 9, 1956

INVENTOR
CHARLES J. WHEELER
BY C. T. Cross
ATTORNEY

United States Patent Office 2,835,969
Patented May 27, 1958

2,835,969

APPARATUS FOR SEVERING CAST IRON PIPE AND THE LIKE

Charles J. Wheeler, Mentor, Ohio, assignor to Wheeler Manufacturing Corporation, Ashtabula, Ohio, a corporation of Ohio Original application November 9, 1956, Serial No. 621,408. Divided and this application October 29, 1957, Serial No. 693,152

6 Claims. (Cl. 30—92)

This invention relates to the cutting of hollow articles, and more particularly relates to new and improved readily adjustable apparatus for cutting cylindrical or tubular articles.

This is a divisional application based on my prior application Serial No. 621,408, filed November 9, 1956, and a continuation-in-part of my application Serial No. 578,208, filed April 16, 1956.

Up to the present time, the cutting of hollow articles, especially cylindrical or tubular articles such as various types of conduits or pipes, notably cast iron pipe, frequently has been a difficult and time-consuming operation. Cast iron pipe of varying sizes and wall thicknesses is typical of a hollow article which has heretofore been especially difficult to cut quickly and accurately. For that reason, cast iron pipe is particularly referred to throughout the specification and claims although it is to be understood that the practice of this invention, while especially advantageous in the cutting of cast iron pipe is not limited thereto.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while affording means of cutting pipe accurately, generally is slow and relatively costly since the saw blade life often is relatively short. Moreover, it will be appreciated that, at times, the use of a power hack saw is either impracticable or impossible. Moreover, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting cost and space limitations are additional factors to be considered.

While the invention described and claimed in my above-mentioned application comprises a highly advantageous apparatus and method, and represents a singular advance over the prior art, the present invention represents an improvement thereover which provides a more rapid and simple control and ready adjustment of the compound leverage pressure clamp to facilitate cutting articles of varying sizes.

Accordingly, the principal object of this invention is to avoid the difficulties heretofore encountered and to provide a new and improved method and readily adjustable apparatus for cutting pipe or other hollow articles of varying sizes.

Accordingly, the principal object of this invention is to avoid the difficulties heretofore encountered and to provide a new and improved method and readily adjustable apparatus for cutting pipe or other hollow articles of varying sizes.

A further object of the invention is the provision of new and improved adjustable apparatus for cutting hollow articles, notably cast iron pipe.

A still further object of the invention is to provide new and hand operable, adjustable apparatus for quickly and accurately cutting pipe.

These and other objects and advantages of the invention will appear more fully from the following description thereof:

Apparatus of this invention adapted to cut a hollow article generally includes at least one cutter having a cutting edge adapted, while substantially stationary with respect to the article, to exert radially-directed, article-cutting pressure and readily adjustable means to apply pressure to said cutting edge. A preferred embodiment contemplates adjustable apparatus which is adapted to provide circumferentially uniform radial article-cutting pressure at a plurality of uniformly spaced points on said article, i. e. around the circumference of the article where cutting is desired.

A more specifically preferred embodiment of apparatus of this invention utilizes a plurality of cutters connected into a non-extensible linkage adapted to surround the article to be cut and while stationary with respect thereto to apply, via a readily adjustable compound leverage pressure clamp more fully described hereinafter, uniformly circumferentially distributed, radially-directed pressure sufficient to cut the article, e. g., four inch diameter cast iron pipe, without rotation or oscillation of the apparatus about the article.

Briefly, the present invention specifically contemplates cutter apparatus comprising a non-extensible linkage including a plurality of spaced cutters and a readily-adjustable compound leverage pressure clamp having a first jaw secured to one end of the linkage and a second jaw pivotally secured to said first jaw and adapted to engage the linkage at a point dictated by the size of the article to be cut, the second jaw comprising two pivotally but adjustably and rigidly secured elements which permit ready and simple adjuetment of the jaw spacing to effect cutting of articles of varying sizes.

Referring to the accompanying drawing.

Figure 1:
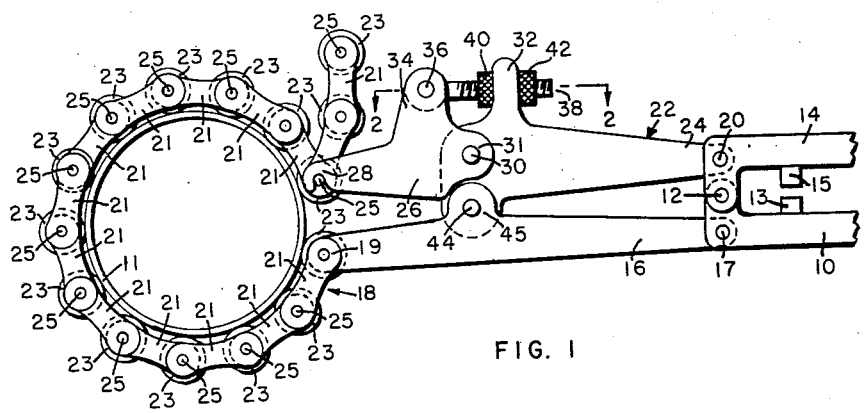
Fig. 1 is a fragmentary view of this invention.
Figure 2:
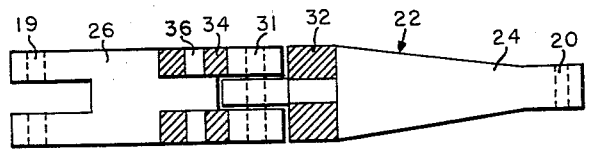
Fig. 2 is an enlarged fragmentary view, partially in section and with parts broken away, of a portion of the apparatus of Fig. 1 taken along the line 2—2 of Fig. 1.
Figure 3:
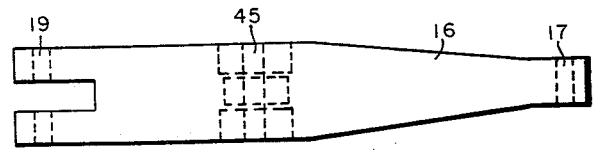
Fig. 3 is an enlarged view of a portion of the apparatus of Fig. 1.

Referring more specifically to the drawing, in Figs. 1, 2 and 3, there is illustrated apparatus of this invention disposed in position about a pipe 11 to be cut. The apparatus comprises, in combination, a first power lever 10 pivotally joined at a first common pivot 12 to a similar second power lever 14, the levers having closure stops 13 and 15, respectively, therebetween. Pivotally secured at 17 to the first power lever 10 at one end is a first clamp jaw 16 which at its opposite end is pivotally secured at 19 to a cutter linkage indicated generally at 18.

Pivotally secured to the second power lever 14 adjacent the first common pivot 12, at 20 is a second clamp jaw designated generally at 22 and comprising in combination a first rigid element 24 and a second rigid element 26, the latter element adapted to engage the cutter linkage 18 via a clamp or hook 28. The first rigid element 24 and second rigid element 26 are pivotally joined at 30 via a pin 31 and are provided with lateral extensions 32 and 34, respectively, substantially at right angles thereto. Pivotally secured to extension 34 at 36 is a threaded stud 38 extending through extension 32 and threadedly engaged by knurled nuts 40 and 42. Clamp jaws 16 and 22 are pivotally joined in a pivotal connection 44 by a pin 45 substantially underneath the pivotal connection 30 connecting the first and second rigid elements 24 and 26 of the second clamp jaw 22.

Figure 4:
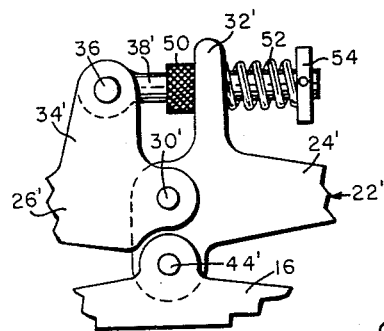
Fig. 4 is a fragmentary view of another embodiment of the invention.

Fig. 4 illustrates another embodiment of the invention wherein a stud 38', pivotally secured to an extension 34' of a second rigid element 26' extends through an extension 32' and is threadedly engaged on one side thereof by a nut 50 and resiliently biased against the opposite side of extension 32' by a spring 52 and a stop plate 54. The other elements shown in Fig. 4 correspond to the elements shown in Figs. 1, 2 and 3 having the same, but unprimed numbers.

In apparatus of this invention, cutting pressure is applied by pressing together the power levers 10 and 14, thus forcing apart the pivots 17 and 20 and thereby pivoting, with greatly increased force, clamp jaws 16 and 22 about the pivot 44 with the result that a high degree of tension is applied to the cutter assembly disposed about the pipe to be cut. This tension transmits a circumferentially-uniform, radially-directed pressure which effects a clean, sharp cutting of the pipe.

To adjust the apparatus, nuts 40 and 42, preferably knurled as shown, are loosened and tightened after adjusting the relative positions of rigid elements 24 and 26, thereby adjusting the spacing of clamp jaws 16 and 22 to permit cutting articles of varying sizes. It will be appreciated, hence, that apparatus of this invention permits rapid and easy hand adjustment of the cutter in use to cut articles of widely varying sizes.

The cutter assembly referred to generally at 18 comprises a plurality of links 21 supporting uniformly-spaced cutters 23 assembled into a non-extensible chain or linkage by pins 25 extending through said cutters and links to permit engagement thereof by the hook 28 of element 26, said assembly adapted when disposed about an article to be cut, e. g., pipe 11, to effect cutting thereof while stationary with respect thereto when tension is applied to said cutter assembly by the clamp jaws 16 and 22.

The various cutters, clamp jaws and other apparatus elements described herein may be formed of any suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter the particular steel employed in forming the cutters and cutting edges is dictated by a consideration of the hardness, brittleness, availability, etc. The angle included between the surfaces defining a cutting edge generally may be varied also, a typically preferred angle being about 45°.

It is to be understood that although the invention has been described with specific reference to particular embodiments thereof, it is not to be so limited, since changes and alterations therein may be made which are within the full intended scope of this invention as defined by the appended claims.

What is claimed is:

1. Apparatus for cutting a hollow article, said apparatus including at least one cutter having a cutting edge capable of cutting said article while disposed thereabout and stationary with respect thereto, via radially-directed pressure, and a compound leverage pressure clamp for applying said pressure, said clamp comprising, in combination, a pair of power levers pivotally joined at a first common pivot, a first clamp jaw pivotally secured at one end to one of said power levers adjacent said first common pivot and at its opposite end to said cutter, an adjustable second clamp jaw, comprising, in combination, a first rigid element pivotally secured at one end to the other power arm adjacent said first common pivot and at its opposite end about a second common pivot to a second rigid element having means thereon to engage said cutter, said first and second rigid elements having lateral extensions thereon and means to lock said first rigid element and said second rigid element into a rigid clamp jaw, said first and second clamp jaws being pivotally connected at a third common pivot intermediate their ends.

2. Apparatus according to claim 1 wherein said cutter comprises a non-extensible linkage including a plurality of cutting adges.

3. Apparatus according to claim 1 wherein said cutter comprises a non-extensible linkage provided with a plurality of circular cutting edges.

4. Apparatus according to claim 1 wherein the means to effect locking of said first and second rigid elements into a rigid second clamp jaw comprises a threaded stud secured to one of said lateral extensions and extending through the other extension said stud having at least one locking nut thereon to permit ready alteration of the relative positions of said elements about said common pivot thereby to adjust the spacing of the clamp jaws.

5. Apparatus according to claim 1 wherein the power levers are joined pivotally through lateral extensions at one end thereof and said clamp jaws pivotally originate from the ends of said levers.

6. Apparatus according to claim 1 wherein the means to effect locking of said first and second rigid elements comprises a threaded stud pivotally secured to one of said lateral extensions and projecting through the other and having a locking nut on said stud therebetween and resilient means biasing one extension against said nut.

No references cited.